United States Patent
Puttonen et al.

(10) Patent No.: US 8,892,101 B2
(45) Date of Patent: Nov. 18, 2014

(54) RADIO PROBLEM DETECTION ASSISTED RESCUE HANDOVER

(75) Inventors: Jani Paavo Johannes Puttonen, Palokka (FI); Janne Markus Kurjenniemi, Jyväskylä (FI); Olli Petteri Alanen, Vantaa (FI)

(73) Assignee: Nokia Corporation, Espoo (FI)

( * ) Notice: Subject to any disclaimer, the term of this patent is extended or adjusted under 35 U.S.C. 154(b) by 577 days.

(21) Appl. No.: 12/623,991

(22) Filed: Nov. 23, 2009

(65) Prior Publication Data

US 2011/0124340 A1    May 26, 2011

(51) Int. Cl.
| | |
|---|---|
| *H04W 36/00* | (2009.01) |
| *H04W 36/24* | (2009.01) |
| *H04W 24/02* | (2009.01) |
| *H04W 72/04* | (2009.01) |
| *H04W 76/02* | (2009.01) |
| *H04W 36/30* | (2009.01) |

(52) U.S. Cl.
CPC ...... *H04W 36/0083* (2013.01); *H04W 36/0061* (2013.01); *H04W 36/0072* (2013.01); *H04W 36/24* (2013.01); *H04W 24/02* (2013.01); *H04W 72/0413* (2013.01); *H04W 76/028* (2013.01); *H04W 72/042* (2013.01); *H04W 36/30* (2013.01)
USPC ........ 455/437; 455/67.13; 455/436; 455/438; 455/439; 455/440; 455/442; 455/443; 370/216; 370/331; 370/332; 370/333; 370/328

(58) Field of Classification Search
CPC ............ H04W 36/0055; H04W 36/30; H04W 36/0083; H04W 24/10; H04W 36/08; H04W 24/02; H04W 36/0072; H04W 76/027; H04W 76/028; H04W 36/00; H04W 36/20; H04W 36/0061; H04W 36/14; H04W 36/34
USPC .................. 455/69, 115.1, 115.2, 115.3, 134, 455/161.3, 226.1–226.3, 422.1, 423–425, 455/432.1, 434, 435.1, 436–444, 458, 464, 455/509, 512, 513, 515, 522, 524, 525, 561, 455/67.11, 67.13; 370/252, 310, 310.2, 370/328–333, 335, 342, 491, 500, 216
See application file for complete search history.

(56) References Cited

U.S. PATENT DOCUMENTS

| | | | |
|---|---|---|---|
| 6,515,044 B1 * | 2/2003 | Idel et al. ...................... | 523/351 |
| 8,145,135 B2 * | 3/2012 | Dalsgaard et al. ......... | 455/67.11 |

(Continued)

FOREIGN PATENT DOCUMENTS

| | | |
|---|---|---|
| CN | 101374321 A | 2/2009 |
| CN | 101534530 A | 9/2009 |

(Continued)

OTHER PUBLICATIONS

3GPP TS 36.300 V9.1.0 (Sep. 2009); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 9); Sep. 2009, pp. 1-165, 3GPP, Valbonne, France.

(Continued)

*Primary Examiner* — Olumide T Ajibade Akonai
(74) *Attorney, Agent, or Firm* — Squire Patton Boggs (US) LLP

(57) ABSTRACT

Rescue handovers of user equipment, for example, may be accomplished by a method that includes detecting that a downlink radio link cannot be reliably received. The method can also include initiating sending a report that the downlink radio link cannot be reliably received when the detecting indicates that the downlink radio link cannot be reliably received. The method can further include initiating performing a handover upon obtaining handover instructions responsive to the report.

20 Claims, 13 Drawing Sheets

(56) References Cited

U.S. PATENT DOCUMENTS

| | | | |
|---|---|---|---|
| 8,280,375 B2 * | 10/2012 | Du et al. | 455/436 |
| 8,305,997 B2 * | 11/2012 | Virkki et al. | 370/332 |
| 2004/0120286 A1 * | 6/2004 | Schwarz | 370/331 |
| 2005/0202821 A1 * | 9/2005 | Pischella | 455/436 |
| 2008/0220784 A1 * | 9/2008 | Somasundaram et al. | 455/437 |
| 2008/0261600 A1 * | 10/2008 | Somasundaram et al. | 455/436 |
| 2009/0046573 A1 * | 2/2009 | Damnjanovic | 370/216 |
| 2009/0186615 A1 * | 7/2009 | Kwon et al. | 455/436 |
| 2009/0257353 A1 * | 10/2009 | Song et al. | 370/241 |
| 2009/0323638 A1 * | 12/2009 | Catovic et al. | 370/331 |
| 2010/0093356 A1 * | 4/2010 | Lee et al. | 455/437 |
| 2010/0173626 A1 * | 7/2010 | Catovic et al. | 455/423 |
| 2011/0026484 A1 * | 2/2011 | Fox et al. | 370/331 |
| 2011/0026492 A1 * | 2/2011 | Frenger et al. | 370/331 |
| 2011/0028144 A1 * | 2/2011 | Catovic et al. | 455/423 |
| 2011/0039546 A1 * | 2/2011 | Narasimha et al. | 455/423 |
| 2011/0039557 A1 * | 2/2011 | Narasimha et al. | 455/434 |
| 2011/0059741 A1 * | 3/2011 | Klein | 455/436 |
| 2011/0117908 A1 * | 5/2011 | Huang et al. | 455/423 |
| 2011/0269469 A1 * | 11/2011 | Xiao et al. | 455/436 |

FOREIGN PATENT DOCUMENTS

| | | |
|---|---|---|
| EP | 2 026 610 A1 | 2/2009 |
| WO | 2008/151325 A1 | 12/2008 |
| WO | 2009/096883 A1 | 8/2009 |

OTHER PUBLICATIONS

International Search Report application No. PCT/FI2010/050929 dated Mar. 14, 2011.

Chinese Office Action issued on Jun. 24, 2014, in corresponding Chinese Patent Application No. 201080052945.8, 7 pages.

* cited by examiner

Difference between the serving cell RSRP and best cell RSRP at the time of Qout detection.

Total amount of HOs with the default HO procedure with HO margin of 3 dB and TTT of 256 ms.

RADIO PROBLEM DETECTION ASSISTED RESCUE HANDOVER

BACKGROUND

1. Field

Various and non-limiting embodiments of the present invention generally relate to a device and evolved Node-B for Long Term Evolution (LTE) standards including LTE and LTE-A in Third Generation Partnership Project (3GPP). More generally, various embodiments of the present invention may be broadly applicable to handovers in wireless communications.

2. Description of the Related Art

The inability of two network elements to communicate with one another of a physical interface, such as the air interface, may be the result of degradation of the interface, leading to failure of the radio link. Such failures may be detected by the physical layer when the failure occurs, regardless of the cause of the failure. Indeed, radio link failures (RLFs) can occur for a variety of reasons in wireless communication systems.

The amount of RLFs may be decreased by using smaller handover margins and shorter time to trigger (TTT) values. This may dramatically reduce the number of RLFs, but may also increase the number of handovers to the same extent. Every handover may result in a short period of time for the user equipment (UE) when it is not connected to the network and every handover may result in signaling in both radio access network (RAN) and core network.

Transmission time interval (TTI) bundling in uplink (UL) and power boosting for handover commands, so that the handover related signaling messages would go through faster and more reliably are two ways that overall handover performance may be improved.

SUMMARY

Certain non-limiting embodiments of the present invention may include a method. The method can include detecting that a downlink radio link cannot be reliably received. The method can also include initiating sending a report that the downlink radio link cannot be reliably received when that is the case. Initiating performing a handover upon obtaining handover instructions responsive to the report can also be included in the method.

Another embodiment of the present invention can also be a method, which can include obtaining a report indicating that a downlink radio link cannot be reliably received. The method can also include initiating sending a command requiring a user equipment that prepared the report to be handed over to a target base station.

A further embodiment of the present invention is a computer readable medium encoded with instructions that, when executed on a processor, cause the processor to perform one of the methods described above.

Another embodiment of the present invention is an apparatus including at least one memory including computer program code and at least one processor. The at least one memory and the computer program code are configured to, with the at least one processor, cause the apparatus at least to detect that a downlink radio link cannot be reliably received, initiate sending a report that the downlink radio link cannot be reliably received when the detecting indicates that the downlink radio link cannot be reliably received, and initiate performing a handover upon obtaining handover instructions responsive to the report.

An additional embodiment of the present invention is an apparatus including at least one memory including computer program code and at least one processor. The at least one memory and the computer program code are configured to, with the at least one processor, cause the apparatus at least to obtain a report indicating that a downlink radio link cannot be reliably received and initiate sending a command requiring a user equipment that prepared the report to be handed over to a target base station.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Long Term Evolution (LTE) in the Third Generation Partnership Project (3GPP) can utilize a user equipment (UE) assisted hard handover procedure, in which the UE periodically measures the reference symbol received power (RSRP) and reports the measurements to the evolved node-b (eNB) either periodically or triggered by an event. Periodic measurement reports may cause high control message overhead in uplink (UL). Thus, certain embodiments of the present invention may be beneficial for periodic measurement situations as well as event-triggered measurement situations.

Other handover measurement quantities are also possible. For example, reference symbol received quality (RSRQ) is another measurement quantity. Other handover measurement quantities are also permitted.

The eNB may be responsible for deciding whether a handover should be triggered and to which target cell the UE should be handed over. After handover related negotiations, the eNB can send a handover command to the user equipment (UE) to which the UE can respond with a handover complete to the target cell eNB. A hard handover is a handover in which the UE breaks the connection to the source cell before initiating a new connection to the target cell, leading to a short interruption in the service. This is distinguishable from a soft handover in which the UE is simultaneously connected to two or more cells.

To avoid excess and/or ping-pong handovers, a hysteresis (i.e. margin) as well as time-to-trigger (TTT) may be utilized in addition to the RSRP averaging in both time and frequency. The handover performance may be a trade-off between the number of handovers and UE experienced channel quality, since using a higher handover margin and longer TTT dramatically may decrease the number of handovers but at the same time delay the actual beginning of the handover process.

Figure 1:
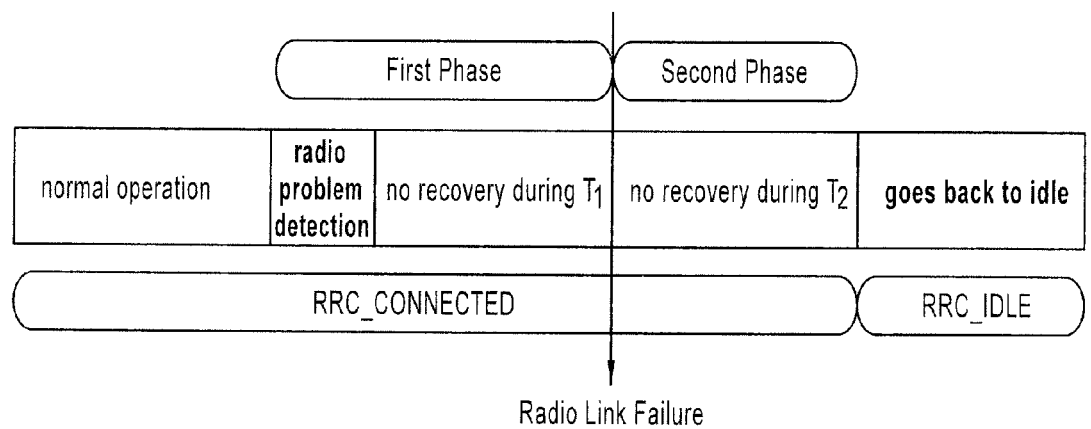
FIG. 1 illustrates a radio link failure procedure.

Radio link failure (RLF) is one indication of poor channel quality conditions in LTE. In RLF, an active radio resource control (RRC) connection can be dropped due to link quality degradation. In principle, RLF can occur if handovers are delayed too much, if there is high interference, or if a user is at the edge of coverage. The UE can monitor the downlink (DL) link quality based on the cell-specific reference signal. RLF procedure is illustrated in FIG. 1. The first phase of RLF can start upon radio problem detection (e.g. Qout detection) and it may lead to RLF detection. The second phase can lead to an RRC_IDLE state. Both phases can utilize separate absolute thresholds and timers or counting criteria (T1 and T2). UE may alone be responsible for all RLF detection related issues, thus the eNB may not be aware of the RLF until a cell re-selection occurs.

Figure 2:
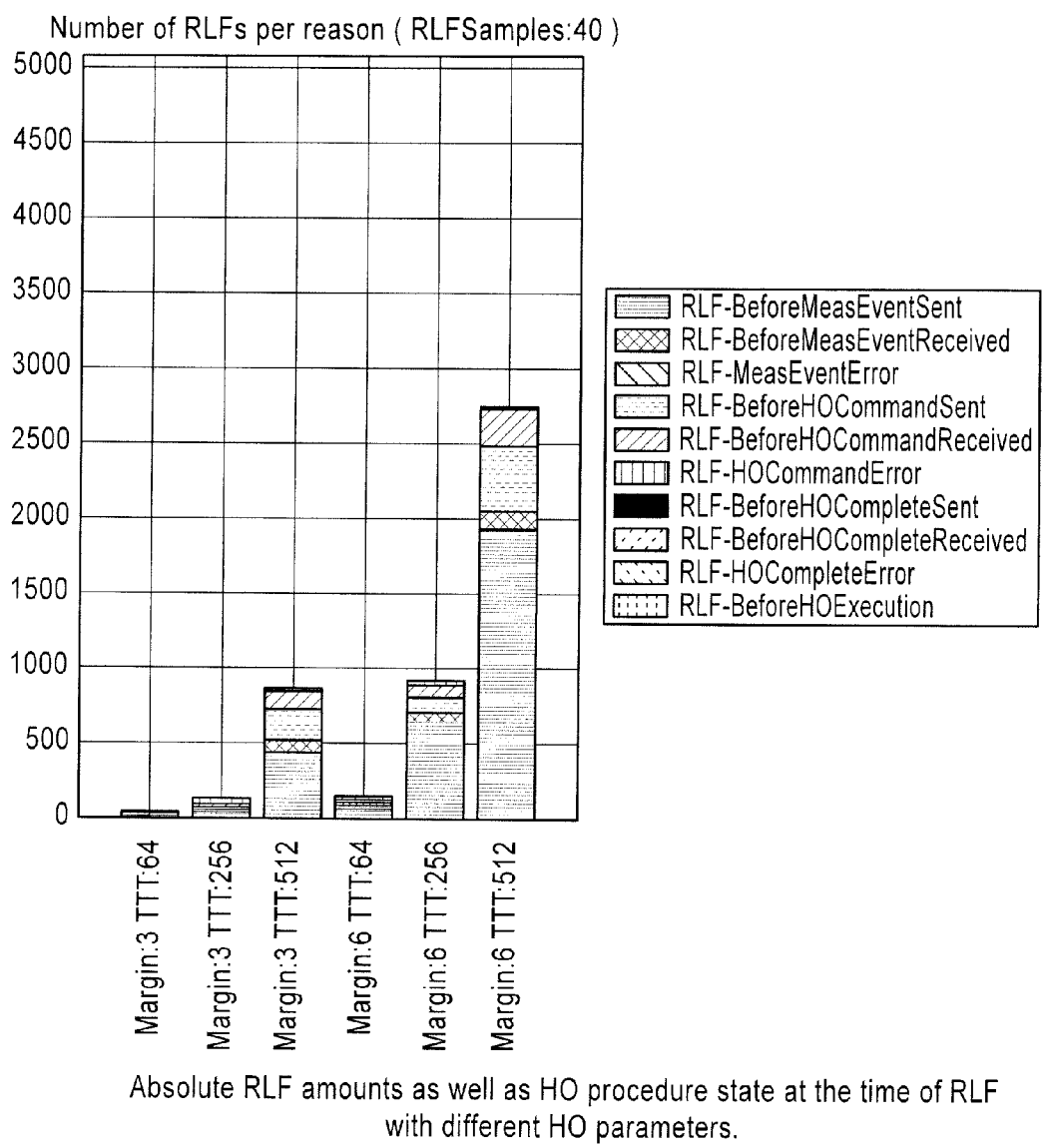
FIG. 2 illustrates the absolute RLF amounts as well as handover procedure state at the time of RLF with different handover parameters.

Margins and TTTs in the handover procedure may be necessary to avoid excess handovers, as illustrated in FIG. 2. However, in macro scenarios with relatively high inter-site distance, shadowing, fast fading and even propagation conditions may result in signal quality becoming poor at sector and site borders. This is emphasized in high interference and mobility conditions (for example, high load and high User Equipment (UE) velocity). In such situations, using the large margins or long TTTs may result in RLFs before the handover process can be completed successfully. The handover process may take time; from tens of milliseconds to hundreds of milliseconds depending on, for example, radio access network (RAN) performance and core network delays. The handovers typically occur at sector and site borders, so the signal quality might be quite poor, resulting in several hybrid automatic repeat request (HARQ) retransmissions and additional delay.

Figure 3:
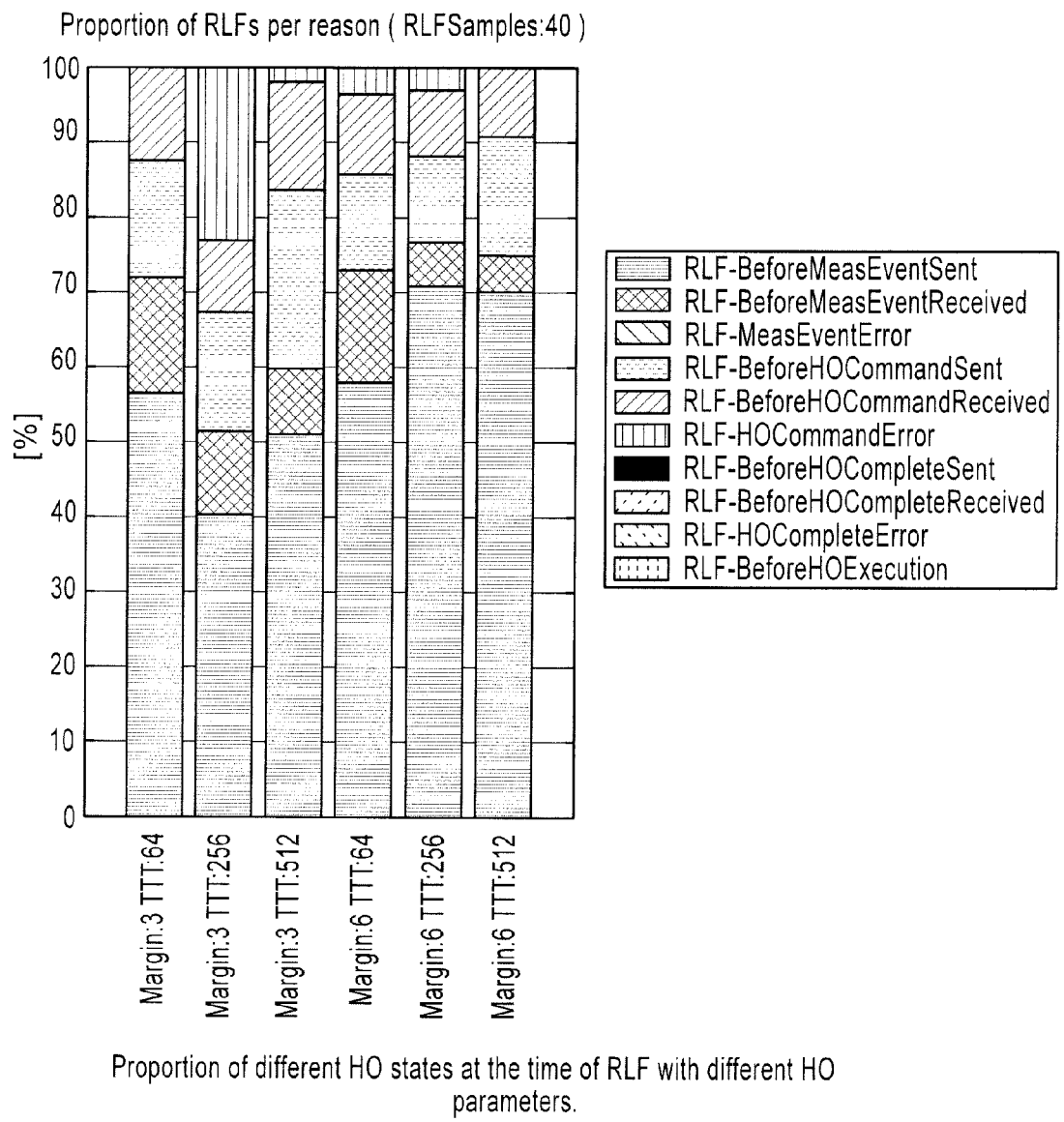
FIG. 3 illustrates the proportion handover being in a certain state at the time of RLF with different handover parameters.
Figure 4:
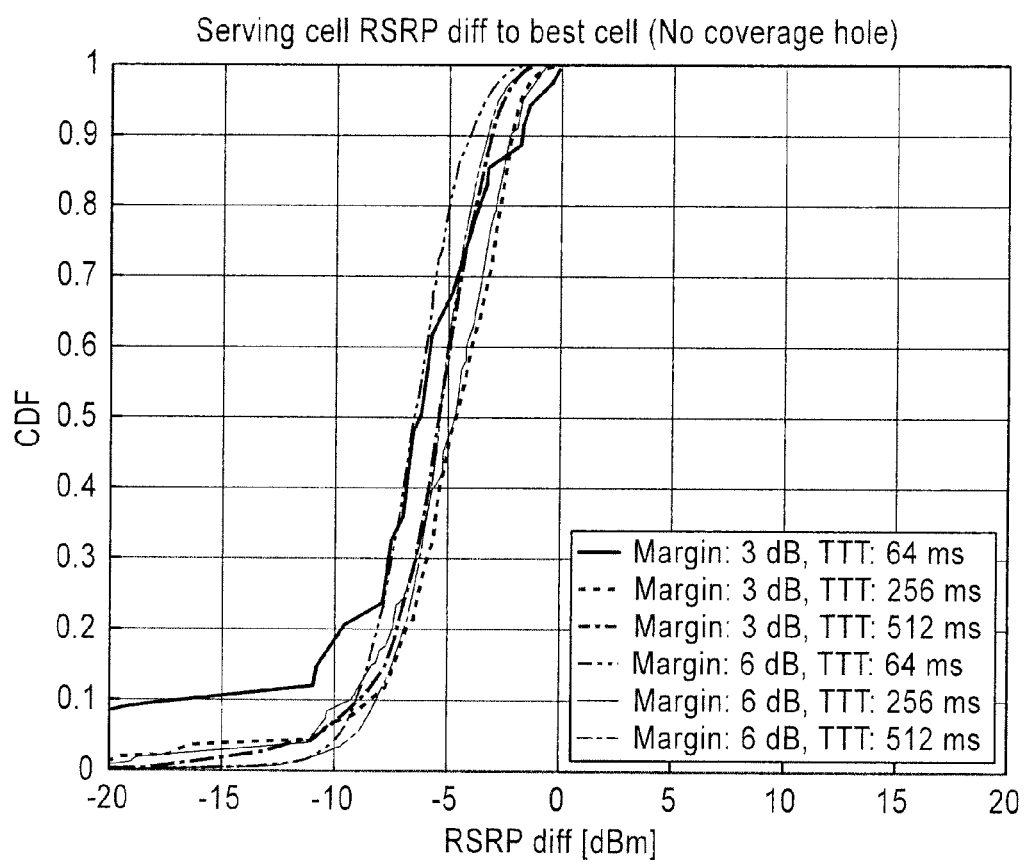
FIG. 4 illustrates a cumulative distribution function (CDF) of the difference between serving cell reference symbol received power (RSRP) and current best cell RSRP at the time of Qout detection.
Figure 5:
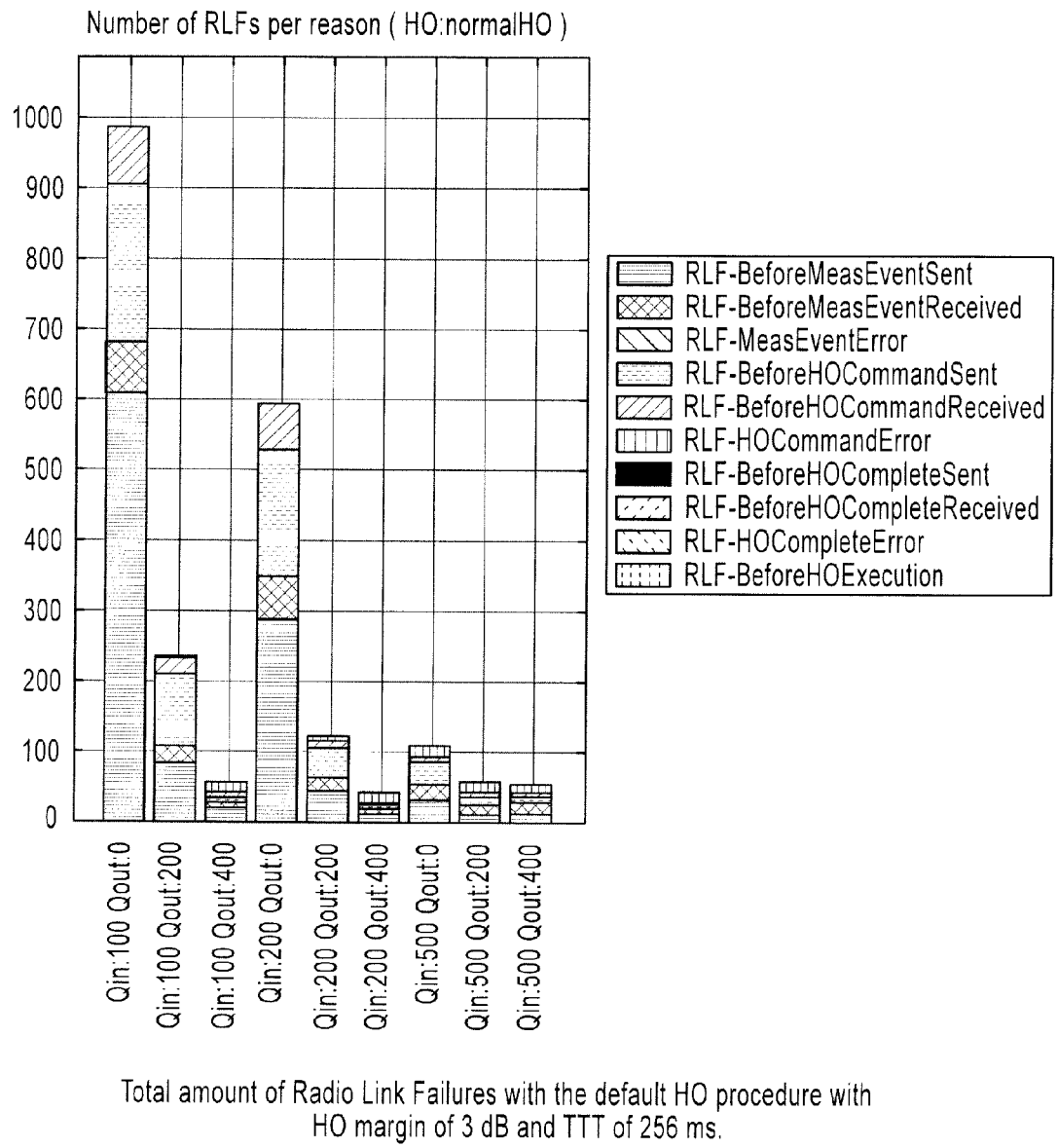
FIG. 5 illustrates the total amount of occurred RLFs as well as status of handover process at the time of RLF with normal handover procedure and with different Qout and Qin parameters for RLF.
Figure 6:
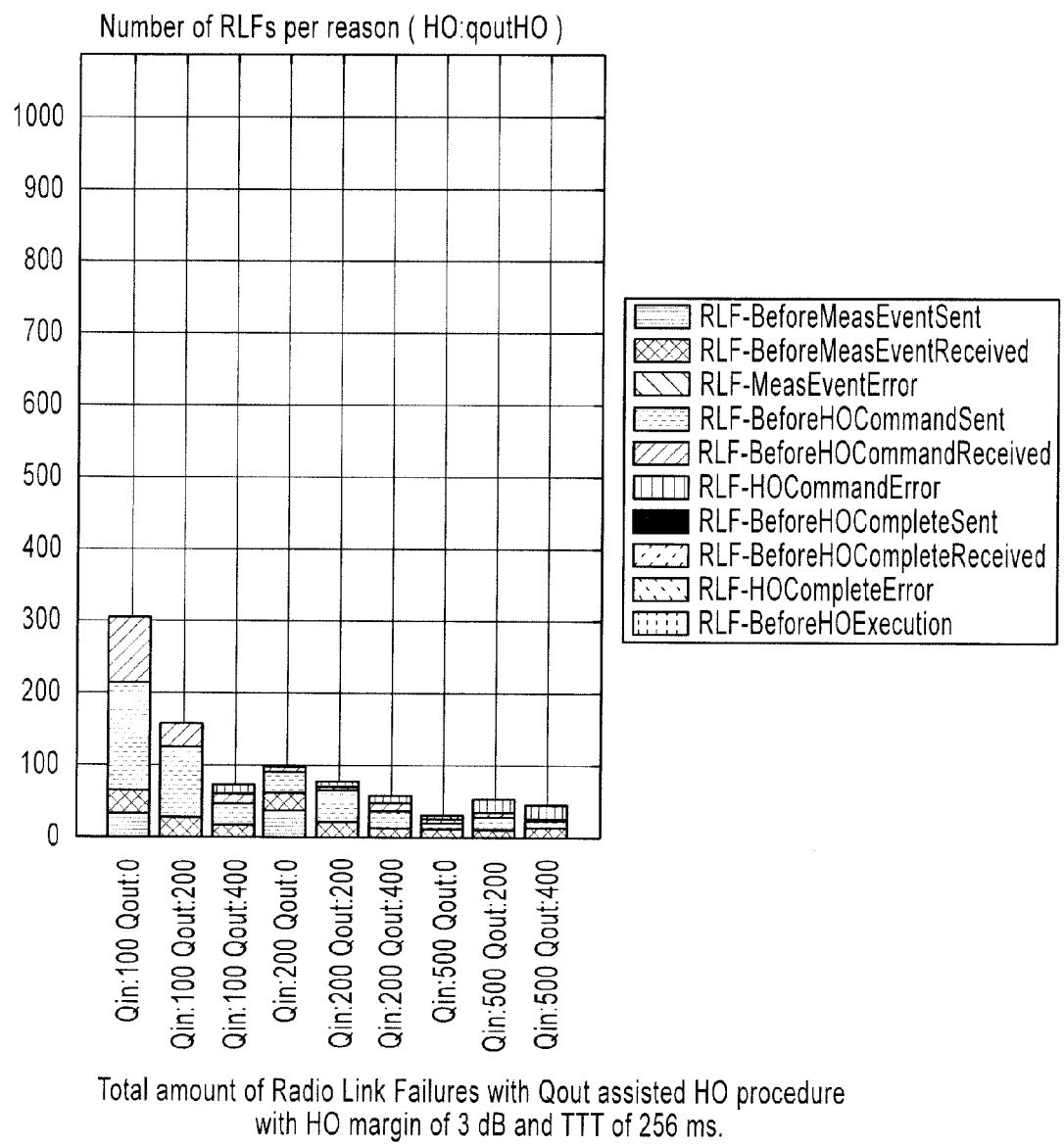
FIG. 6 illustrates the total amount of occurred RLFs as well as status of handover process at the time of RLF with Qout assisted handover procedure and with different Qout and Qin parameters for RLF.
Figure 7:
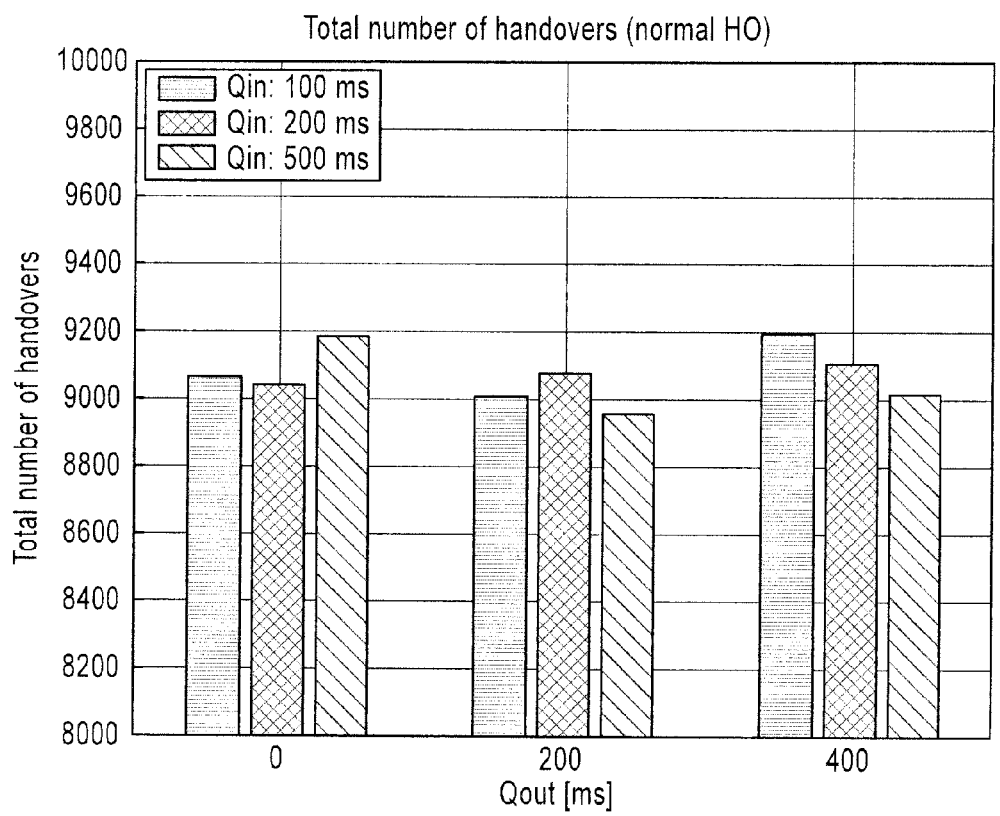
FIG. 7 illustrates the total number of handovers with normal handover procedure with different Qout and Qin parameters.
Figure 8:
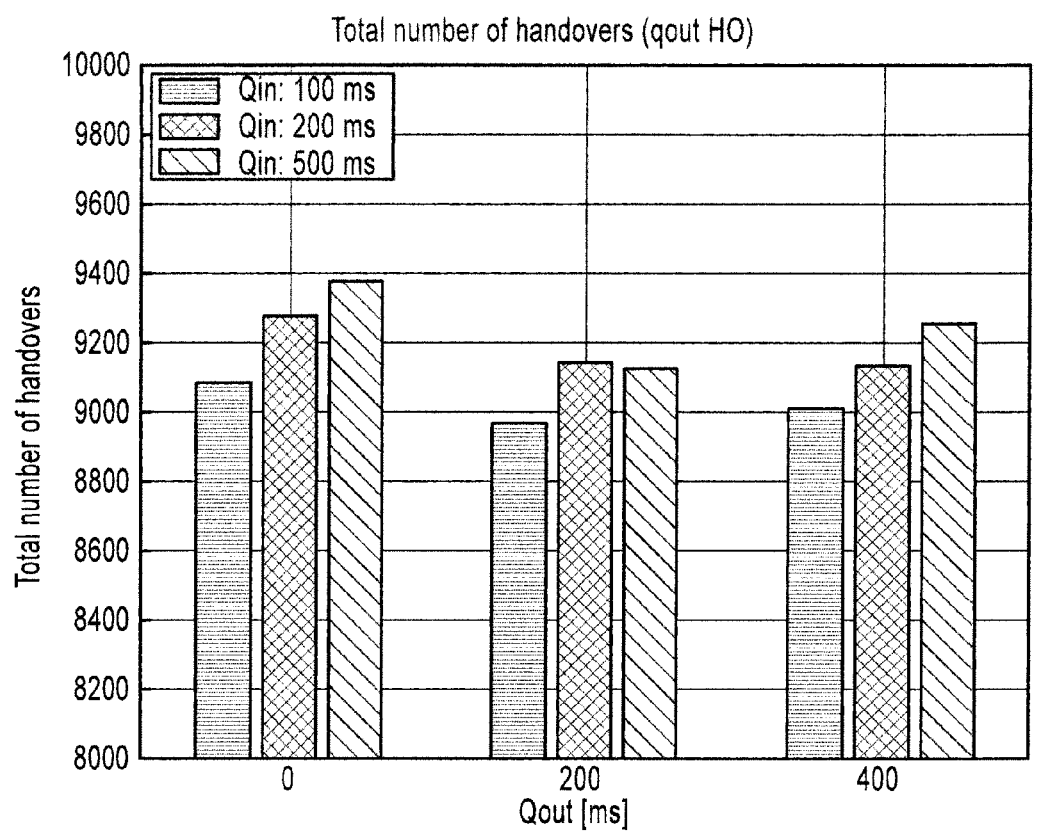
FIG. 8 illustrates the total number of handovers with Qout assisted handover procedure with different Qout and Qin parameters.
Figure 9:
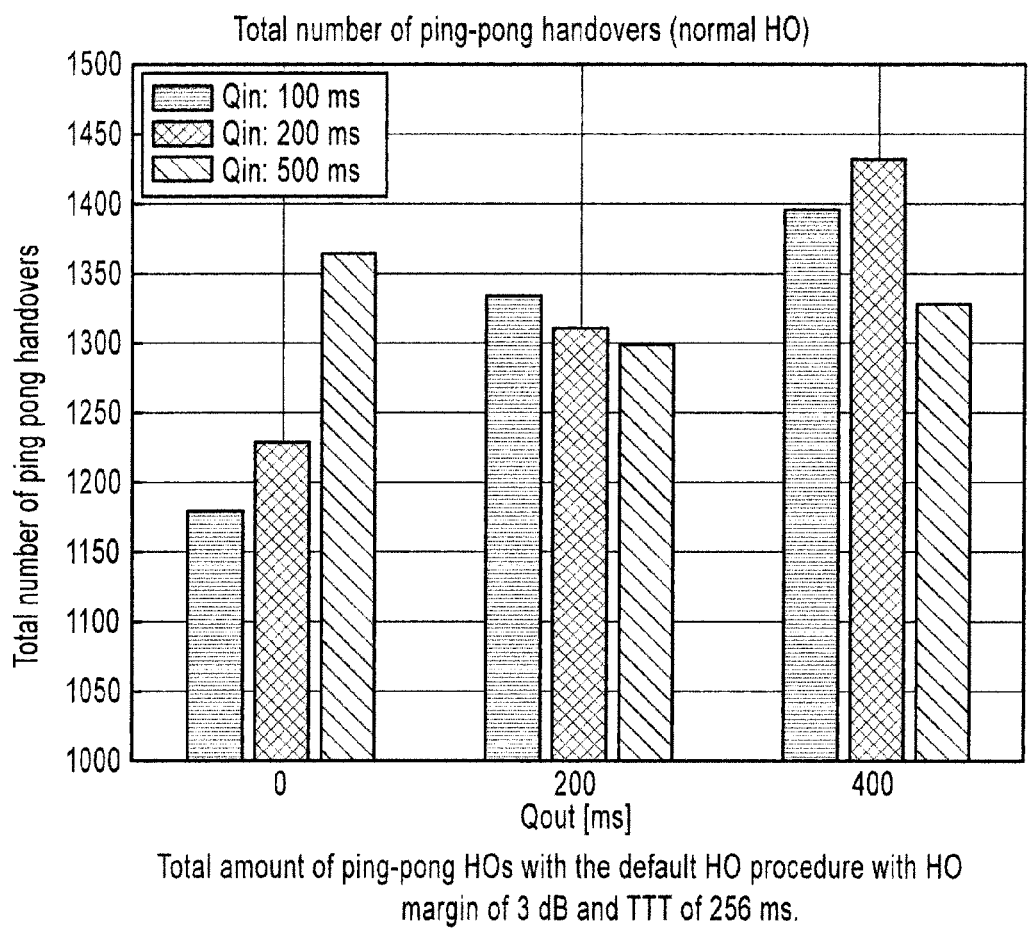
FIG. 9 illustrates the total number of ping-pong handovers with normal handover procedure with different Qout and Qin parameters.
Figure 10:
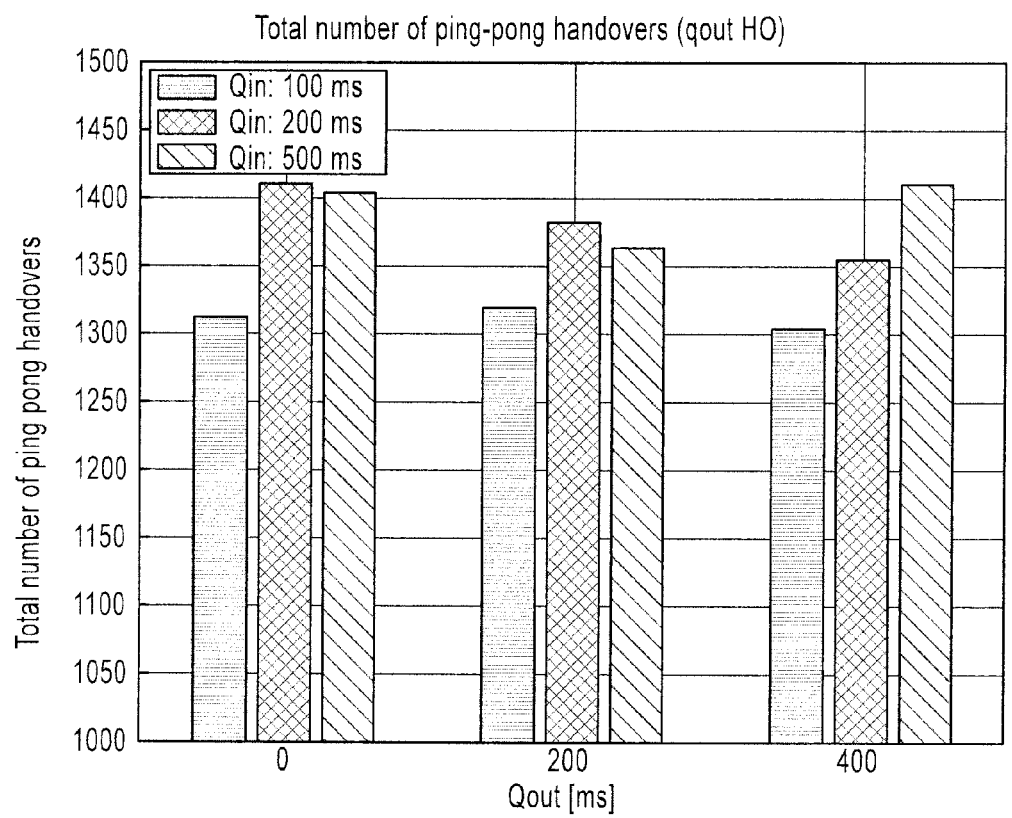
FIG. 10 illustrates the total number of ping-pong handovers with Qout assisted handover procedure with different Qout and Qin parameters.

In coverage limited scenarios as well as challenging interference and mobility conditions, the event triggered measurement report may not be even sent to eNB at the time of RLF, as is illustrated in FIG. 3. The legends stand for different states in handover procedure in relation to sent signaling messages (measurement report, handover command, and handover complete). With, for example, margin 3 dB and TTT 256 ms, about 40% of the RLFs occur before the measurement report with A3 event (serving cell RSRP is x dB worse than the best cell) is even sent. An A3 event, as used herein, is an event utilized for handover purposes, in which a neighbor cell becomes a specified offset better than the serving cell. When there is RLF before the measurement report with the A3 event is sent, there may be no conventional way of avoiding RLF, as the handover process has not even started. Note that a coverage hole in the network would also tend to result in a high percentage of RLFs occurring before the measurement report is sent, but this is not the case here. RSRP measurement quantity used for handover measurements does not include interference information, and thus may not alone be the best instrument for avoiding link quality problems.

Configuring the RLF parameters (e.g. Qout threshold, Qin threshold, T1, and T2) may require particular care in certain implementations. The timing of when a RLF should occur is not trivial, since it may relate to different environments (macro, urban, or indoor) as well as the handover parameters used. In short, even though both handover and RLF procedures are useful in LTE, the procedures can be essentially independent from each other. As used herein, a Qout threshold is the level at which the downlink radio link cannot be reliably received and corresponds, in the usual situation, to about 10% block error rate of a hypothetical physical downlink control channel (PDCCH) transmission taking into account the physical control format indicator channel (PCFICH) errors. Likewise, as used herein, a Qin threshold is the level at which the downlink radio link quality can be significantly more reliably received than at Qout and corresponds, in the usual situation, to about 2% block error rate of a hypothetical PDCCH transmission taking into account the PCFICH errors. T1 or T310, as used herein, refers to the time (after Qout) for which the Qin threshold level must be met to result a RLF. Similarly, T2 or T311, as used herein, refers to the timer for RRC connection re-establishment procedure after RLF.

Although Qout is used herein as an example of a threshold for minimum reliability, other thresholds are permitted. For example, one may select a different block error rate than 10% or one may measure link reliability by another metric than block error rate, such as error free seconds may be used.

Radio problem (e.g. Qout) detection of the RLF procedure can trigger an event triggered measurement report with a new event type (e.g. QOUT_NOTIFICATION, which can alternatively be referred to as Qout_NOTIFICATION or by any other suitable identifier) to be sent to eNB. At this phase, it is detected that a RLF may be approaching, but still both UL and DL direction may be active. Thus, the QOUT_NOTIFICATION may bypass the handover margins and TTTs, and thus provide a possibility of avoiding potential RLF. While UEs in normal operation may use the default handover parameters, the handover process for UEs in poor radio channel conditions may be improved by speeding up the start of the handover process. The eNB may then decide based on the contents of the measurement report and the handover state of a UE, whether a new handover should be triggered.

The Qout triggered measurement report may be sent at the time of Qout detection, thus the averaged quality goes under the Qout threshold. Thus, at this same time the timer T1 or T310 may be started.

Qout detection can start the first phase of an RLF procedure. In this phase, it is first detected that an RLF may be approaching. At this phase the scheduling is still enabled in both UL and DL and there is still time before the RLF would possibly occur due to the T1 timer of the first phase of the RLF procedure.

When a Qout is detected, there may be no value in waiting for the possibly occurring A3 event and related handover margins and TTTs. Thus, at the time of Qout detection, an event triggered measurement report with a new event type (e.g. QOUT_NOTIFICATION) can be sent to the eNB. The measurement report must include the identification (ID) of the best cell (or the cell ID where it would be recommended to perform a handover) at a minimum, but it may include also other information (e.g. best cell RSRP, serving cell RSRP).

Note that at this point the handover process may or may not be started and at this point a TTT may or may not be already running.

According to the simulation results shown in FIG. 3, at the time of Qout detection on almost 100% of the occasions there is a better cell available. This confirms that the performance can be improved by a Qout detection assisted handover. The eNB can be responsible of finally deciding whether a handover should occur. However, different rules may be utilized also in the UE side before the measurement report is sent. For example, a measurement report can be sent if 1. there is a better cell available than the current cell based on averaged RSRP (this may bypass both handover margin and TTT rules); or
2. there is a TTT running on some cell (this may bypass the handover TTT rule); or
3. there is a TTT started after Qout detection.

In any of these options a check may or may not be performed as to whether an A3 event triggered measurement report has been sent before the Qout detection. This is basically just a question of whether it is desirable to let eNB know about the Qout detection regardless of the current handover status.

The numbered list above may provide options as to how to minimize excessive triggered measurement reports due to Qout detections. In the first option measurement report triggering is enabled if there is a better cell available than the serving cell based on averaged RSRP. This can also be referred to as determining whether is a suitable alternative cell to the serving cell. Thus, neither handover margins nor TTTs are utilized for the measurement report triggering. This option makes sense, since there seems to be no reason to trigger a measurement report if there are no better cells available. On the other hand, this may result in excessive number of handovers and possibly also ping-pong handovers. In the second option, the measurement report is triggered if there is a TTT already running for some cell. Basically, this means that there is some cell which is a handover margin better based on RSRP than the serving cell, but the TTT has not yet expired (thus the target cell has not been more than a handover margin better for the duration of the TTT). If there are multiple TTTs running for different cells, there are multiple options to choose from, e.g. choose the base station (BS) whose TTT expires first or choose the BS which is the best based on RSRP at the triggering moment.

Handover margin (also called offset) is typically defined in terms of the difference between the serving cell RSRP and target cell RSRP. Thus, the target cell RSRP needs to be a handover margin better than the serving cell before the time-to-trigger (TTT) is started and possibly after the TTT a A3 measurement report is sent. By bypassing the handover margins and TTTs, it should be understand that the handover procedure is triggered even if T1 has not yet expired and even if there is no handover margin between the serving cell and the target cell. Thus, the QOUT_NOTIFICATION measurement report might be triggered regardless of the handover margins and TTTs.

Basically how the handover margins and TTTs are bypassed may be a matter of implementation and could be useful in reducing the amount of unnecessary or excess QOUT_NOTIFICATION triggered measurement reports. Using Qout triggered handover in bad channel quality situations (determined by Qout) can be helpful in that the measurement report is triggered regardless of the handover margins and/or TTTs thereby avoiding excess delays in handover procedure. If there is a high probability of a UE ending up in an RLF, the measurement report should be triggered as soon as possible, so that the handover process could be successfully finished before the RLF occurs (or would occur, absent the handover process). There are at least two ways of filtering for the QOUT_NOTIFICATIONs, as mentioned above:

1. A QOUT_NOTIFICATION measurement report may be triggered after a Qout detection if there is a better cell available than the serving cell based on RSRP. Of course there is no point in triggering a QOUT_NOTIFICATION if the UE is already connected to the cell with the best RSRP (this kind of situation may be the result of a coverage hole for example). This rule basically bypasses the handover margin rule, since the target cell RSRP does not need to be a margin better than the serving cell before the measurement report is triggered.

2. A QOUT_NOTIFICATION measurement report may triggered after a Qout detection if there is a TTT running on some cell. In general, a TTT may be started to a target cell if the target cell RSRP is a margin better than the serving cell RSRP. The A3 measurement report may be triggered if the margin rule holds for the duration of the TTT. However, in case of QOUT_NOTIFICATION, it may be unnecessary to wait for the TTT to trigger, but instead the QOUT_NOTIFICATION can be triggered if the TTT evaluation has been started for a certain target cell. The target cell to which the rescue handover would be performed may be chosen in different ways as well, such as the cell with the best instantaneous RSRP or the cell for which the TTT would expire the first.

Thus, a tradeoff may be made between the number of triggered QOUT_NOTIFICATIONs and handover delay. Option 1 may result in slightly higher number of triggered QOUT_NOTIFICATIONs, but on the other hand could reduce the number of RLFs more than Option number 2. The third option identified above, in which the QOUT_NOTIFICATION is triggered when a Qout event has been detected and a TTT is subsequently started, should also be kept in mind This may similarly trigger fewer QOUT_NOTIFICATIONs.

The results comparing the amount of occurred RLFs and total number of handovers with both the default handover procedure and Qout assisted handover procedure are presented in FIG. 4, FIG. 5, FIG. 6, FIG. 7, FIG. 8, and FIG. 9. In these examples, the UE criteria number 1 has been used, in which the QOUT_NOTIFICATION event is triggered when a better available cell is found. The simulation results reveal several interesting facts.

- The total number of RLFs can be reduced with Qout assisted handover when using either Qout filtering of 0 ms or 200 ms. Thus, speeding up the handover start, by the sending of the measurement report, can increase the probability of completing the handover procedure before the RLF would occur.
- The RLFs occurring before the A3 event measurement report are practically non-existent with Qout assisted handover. This is distinguishable from the purely margin and TTT based handover procedures.
- The total number of handovers can be increased when using the Qout assisted handover, since the Qout assisted handover technique offers an improved probability of completing the handover without RLF. However, all of these additional handovers should be considered as necessary, since they are rescuing a UE from otherwise experiencing a RLF.
- The total amount of ping-pong handovers (handovers that occur within a very short time of a previous handover of the same UE) are slightly increased with Qout assisted handovers. This is due to the fact that UE event triggering criteria number 1 bypasses the TTT handover criteria, yet it is the TTT handover criteria that is practically responsible of avoiding ping-pong handovers in the handover procedure.

One benefit of certain non-limiting embodiments of Qout assisted handover is a significant decrease in the number of RLFs as compared to the normal handover procedure based on purely handover margins and TTTs. A decrease in the number of RLFs may help to improve the UE experienced quality of service (QoS), since each RLF could end up in cell re-selection. Additionally, RLFs occurring before the event triggered measurement report has been sent are practically non-existent, which is convenient since RLFs occurring before the event triggered measurement report has been sent are so abrupt that the handover process is unable to begin.

A practical use case for certain embodiments of Qout assisted handover is that a bit larger handover margin and TTT can used in the handover process. This reduces the number of handovers, which lowers signaling overhead for the operators. However, the Qout assisted measurement reporting would improve the situation for UEs that might end up in problems at the cell edge area. With purely margin and TTT based handover we would possibly have to use at least slightly shorter TTT to keep the UEs in poor channel conditions satisfied. So, in one embodiment, the Qout assisted handover is accompanied with margin of 3 dB and TTT of 256 ms. The gains of the Qout assisted handover may be less when the TTT is shorter, e.g. 64 ms, since then the handover procedure is fast enough to rescue the UEs in bad channel conditions. However, setting TTT at 64 ms may result in significantly more handovers, as stated before.

The Qout assisted handover may be used jointly with other handover procedure related improvements. In that way, the Qout assisted handover can improve the delays for poor channel UEs and other mechanisms can improve the error rate of the handover signaling messages, for example.

It should be noted that Qout assisted handover may increase the number of handovers a bit. However, the increase is negligible, since only about 1% of the handovers are linked to Qout detections and RLFs. Also, these additional handovers are rescue handovers and consequently appear to be worthwhile.

Additionally, it should be noted that the first phase of RLF does not always result in a RLF, but can fall back to normal operation. This situation can result in potentially gratuitous handover and also potentially a following ping-pong handover. However, according to the results of simulations, about 70% of the Qout detections lead into a RLF, thus gratuitous handover and resulting ping-pong handover may be limited.

The RLF parameters may require care in their configuration, since different parameters may be optimal for different radio environments and handover parameters. Qout assisted may simplify this configuration complexity, because Qout detection may already trigger a possible rescue handover. In practice, a Qout triggering would include also a timer to avoid unnecessary Qout detections. This could necessitate also a pre-Qout trigger, which could enable the handover process to be started even earlier than the normal Qout detection and thus shortening the delay. One pre-Qout trigger could be considered a case of Qout timer being 0 ms.

One alternative is not to make a new event but simply to ensure that potential running TTT timers are put to expired when Q_out is received on L2, and to send the report. When Qout is triggered, the TTT for a certain UE is set to trigger immediately. This way a normal A3 measurement report is sent to eNB, which may then trigger a handover. This approach may minimize impact on the other procedures in LTE. However, in this approach the eNB is not aware of whether the A3 report was triggered due to Qout or due to a normal TTT procedure. Thus, the BS has lost the control of whether or not the Qout triggered handovers are acceptable. One option is that the usage of Qout assisted handover is signaled as a parameter at the same time as the handover parameters to the UE. However, it should be noted that the first approach discussed above may not require any additional parameterization.

It may be valuable to ensure that reports are not triggered to often or too early. So, some flexible time filter may be used to avoid triggering a report based on a single measurement sample. The Qout procedure in RLF includes filtering, thus is itself functioning as a filter not to trigger too often. Another possibility is to utilize some filtering criteria in addition to Qout detection, such as that TTT needs to be running for the target cell, as described earlier.

Figure 11:
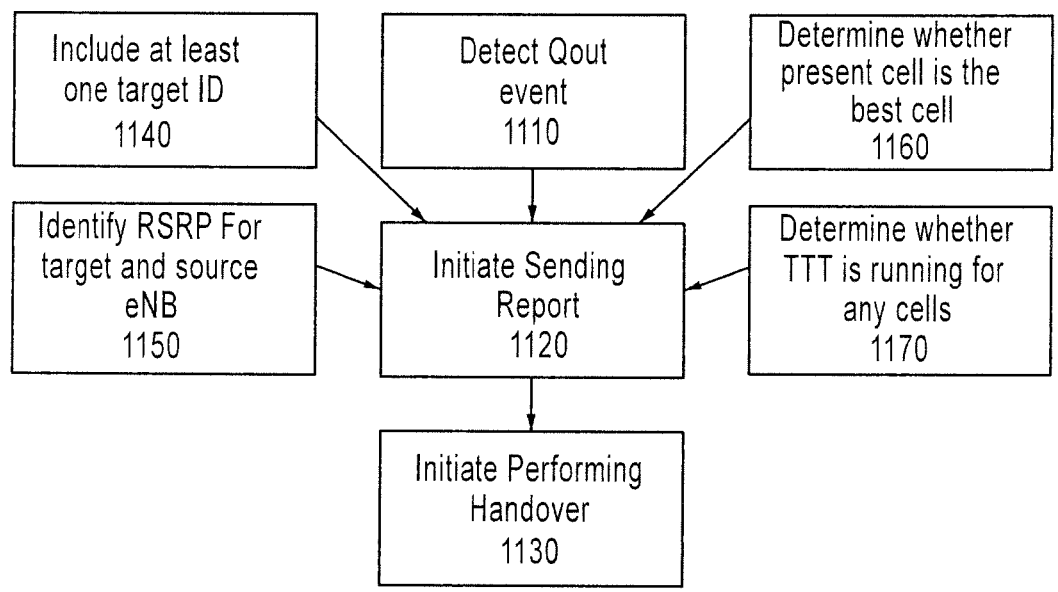
FIG. 11 illustrates a method according to certain non-limiting embodiments of the present invention.

FIG. 11 illustrates a method according to certain embodiments of the present invention. The method of FIG. 11 includes detecting 1110 that a downlink radio link cannot be reliably received. The method also includes initiating 1120 sending a report that the downlink radio link cannot be reliably received when the detecting indicates that the downlink radio link cannot be reliably received. Additionally, the method includes initiating 1130 performing a handover upon obtaining handover instructions responsive to the report.

The method can additionally include preparing 1140 the report to include in the report an identification of at least one base station to which handover is possible, prior to the initiating sending of the report. The method can further include preparing 1150 the report to include in the report an identification of reference symbol received power for one or more base station. The method can likewise include determining 1160 whether there is a better cell available than a current cell based on averaged reference symbol received power prior to initiating sending the report, wherein the initiating sending the report is conditioned on the better cell being available. The method can also or alternatively include determining 1170 whether there is a TTT running on any cell that is a candidate cell for a handover.

Figure 12:
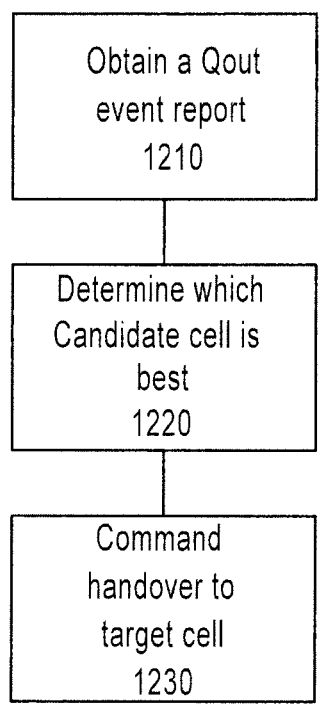
FIG. 12 illustrates another method according to certain non-limiting embodiments of the present invention.

FIG. 12 illustrates a method according to certain embodiments of the present invention. The method of FIG. 12 can include obtaining 1210 a report indicating that a downlink radio link cannot be reliably received. The method can also include initiating 1220 sending a command requiring a user equipment that prepared the report to be handed over to a target base station.

The initiating 1220 sending the command can involve including in the command an identification of the base station obtained from the report. The initiating 1220 sending the command can be conditioned on an analysis of reference symbol received power for at least two base stations identified in the report. The initiating 1220 sending the command can be conditioned on a determination of whether a desired target base station identified in the report can accept a handover. The method can further include determining 1230 from among a plurality of candidate target base stations which base station to which the user equipment is to be handed over based on which TTT is closest to expiring.

The methods of FIGS. 11-12 may be performed by a processor or multiple processors instructed by a computer program or programs embodied on one or more memory device. The processor may be an application specific integrated circuit or it may be a general purpose central processing unit (CPU). The processor of a base station may be adapted to perform the method of FIG. 12, while the processor of a handheld mobile telephone may be adapted to perform the method of FIG. 11. The computer program may be transmitted to the processor, directly loaded unto the processor, or may be stored in non-transient memory. The memory, including non-transient memory, may be memory onboard the processor, or may be a separate random access memory (RAM) or other suitable storage device.

Figure 13:
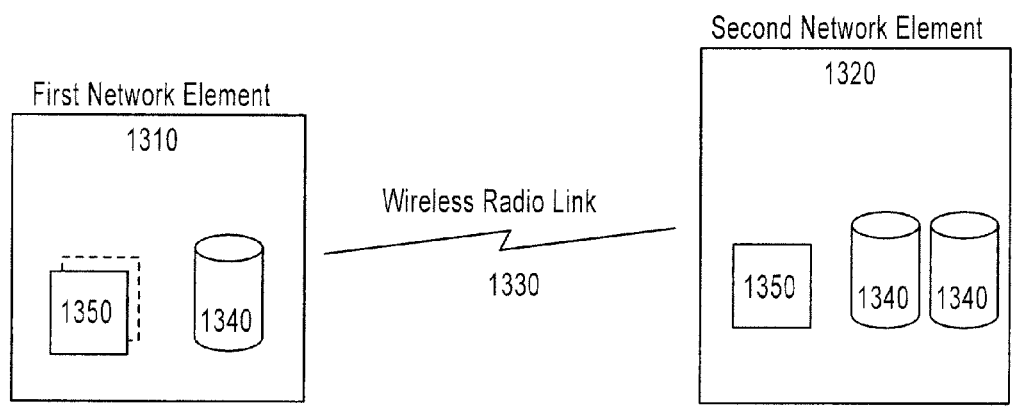
FIG. 13 illustrates a telecommunication system according to certain non-limiting embodiments of the present invention.

FIG. 13 illustrates a system according to certain embodiments of the present invention. The system may include a first network element 1310 and a second network element 1320 connected by a wireless radio link 1330.

Each of the first network element 1310 and the second network element 1320 may include at least one memory 1340 including computer program code and at least one processor 1350. The memory 1340 (or memories, which will simply be referred to in the singular for convenience) and the computer program code of each network element can be configured to, with the processor 1350 (or processors, which, as with the memory 1340, will be referred to in the singular) of the network element, cause the network element at least to perform a set of activities.

In the case of the first network element 1310, the memory 1340 and the computer program code can be configured to, with the processor 1350, cause the first network element 1310 at least to detect that a downlink radio link cannot be reliably received, initiate sending a report that the downlink radio link cannot be reliably received when the detecting indicates that the downlink radio link cannot be reliably received, and initiate performing a handover upon obtaining handover instructions responsive to the report.

The memory 1340 and the computer program code can also be configured to, with the processor 1350, cause the first network element 1310 at least to prepare the report to include in the report an identification of at least one base station to which handover is possible, prior to initiating sending of the report. The memory 1340 and the computer program code can also be configured to, with the processor 1350, cause the first network element 1310 at least to prepare the report to include in the report an identification of reference symbol received power for one or more base station.

The memory 1340 and the computer program code can also be configured to, with the processor 1350, cause the first network element 1310 at least to determine whether there is a better cell available than a current cell based on averaged reference symbol received power prior to initiating sending the report, wherein initiating sending the report is conditioned on the better cell being available. The memory 1340 and the computer program code can also be configured to, with the processor 1350, cause the first network element 1310 at least to determine whether there is a TTT running on any cell that is a candidate cell for a handover.

In the case of the second network element 1320, the memory 1340 and the computer program code can be configured to, with the processor 1350, cause the second network element 1320 at least to obtain a report indicating that a downlink radio link cannot be reliably received and initiate sending a command requiring a user equipment that prepared the report to be handed over to a target base station.

The memory 1340 and the computer program code can also be configured to, with the processor 1350, cause the second network element 1320 at least to include in the command an identification of the base station obtained from the report. The memory 1340 and the computer program code can also be configured to, with the processor 1350, cause the second network element 1320 at least to analyze reference symbol received power for at least two base stations identified in the report.

The memory 1340 and the computer program code can also be configured to, with the processor 1350, cause the second network element 1320 at least to condition initiation of the sending of the command on a determination of whether a desired target base station identified in the report can accept a handover. The memory 1340 and the computer program code can also be configured to, with the processor 1350, cause the second network element 1320 at least to determine from among a plurality of candidate target base stations which base station to which the user equipment is to be handed over based on which TTT is closest to expiring.

The first network element 1310 may be a user equipment such as a mobile telephone, texting device, or personal digital assistant and the second element 1320 may be a base station such as an evolved node B.

One having ordinary skill in the art will readily understand that the invention as discussed above may be practiced with steps in a different order, and/or with hardware elements in configurations which are different than those which are disclosed. Therefore, although the invention has been described based upon these preferred and non-limiting embodiments, it would be apparent to those of skill in the art that certain modifications, variations, and alternative constructions would be apparent, while remaining within the spirit and scope of the invention. Thus, the example embodiments do not limit the invention to the particular listed devices and technologies. For example, although intra-frequency handovers may be one example of the relevant handovers, inter-frequency, and inter-radio-access-technology (inter-RAT) handovers are also permitted. In order to determine the metes and bounds of the invention, therefore, reference should be made to the appended claims.

We claim:

1. A method, comprising:
   detecting that a downlink radio link cannot be reliably received as a radio link failure is approaching;
   initiating sending a report that the downlink radio link cannot be reliably received when the detecting indicates that the downlink radio link cannot be reliably received and further when a time to trigger is running in an available alternative cell; and
   initiating performing a handover upon obtaining handover instructions responsive to the report prior to the radio link failure.

2. The method of claim 1, further comprising:
   preparing the report to include in the report an identification of at least one base station to which handover is possible, prior to the initiating sending of the report.

3. The method of claim 1, further comprising:
   preparing the report to include in the report an identification of reference symbol received power for one or more base station.

4. The method of claim 1, further comprising:
   determining whether there is a suitable alternative cell to a current cell based on averaged reference symbol received power prior to initiating sending the report.

5. The method of claim 1, further comprising:
   determining whether there is a time to trigger running on any cell that is a candidate cell for a handover.

6. A method, comprising:
   obtaining a report indicating that a downlink radio link cannot be reliably received as a radio link failure is approaching and further indicating that a time to trigger is running in an available alternative cell; and
   initiating sending a command requiring a user equipment that prepared the report to be handed over to a target base station prior to the radio link failure.

7. The method of claim 6, wherein initiating sending the command comprises including in the command an identification of the base station obtained from the report.

8. The method of claim 6, wherein the initiating sending the command is conditioned on an analysis of reference symbol received power for at least two base stations identified in the report.

9. The method of claim 6, wherein the initiating sending the command is conditioned on a determination of whether a desired target base station identified in the report can accept a handover.

10. The method of claim 6, further comprising:
determining from among a plurality of candidate target base stations which base station to which the user equipment is to be handed over based on which time to trigger is closest to expiring.

11. An apparatus, comprising:
at least one memory including computer program code; and
at least one processor,
wherein the at least one memory and the computer program code are configured to, with the at least one processor, cause the apparatus at least to
detect that a downlink radio link cannot be reliably received as a radio link failure is approaching;
initiate sending a report that the downlink radio link cannot be reliably received when the detecting indicates that the downlink radio link cannot be reliably received and further when a time to trigger is running in an available alternative cell; and
initiate performing a handover upon obtaining handover instructions responsive to the report prior to the radio link failure.

12. The apparatus of claim 11, wherein the at least one memory and the computer program code are also configured to, with the at least one processor, cause the apparatus at least to:
prepare the report to include in the report an identification of at least one base station to which handover is possible, prior to initiating sending of the report.

13. The apparatus of claim 11, wherein the at least one memory and the computer program code are also configured to, with the at least one processor, cause the apparatus at least to:
prepare the report to include in the report an identification of reference symbol received power for one or more base station.

14. The apparatus of claim 11, wherein the at least one memory and the computer program code are also configured to, with the at least one processor, cause the apparatus at least to:
determine whether there is a suitable alternative cell to a current cell based on averaged reference symbol received power prior to initiating sending the report.

15. The apparatus of claim 11, wherein the at least one memory and the computer program code are also configured to, with the at least one processor, cause the apparatus at least to:
determine whether there is a time to trigger running on any cell that is a candidate cell for a handover.

16. An apparatus, comprising:
at least one memory including computer program code; and
at least one processor,
wherein the at least one memory and the computer program code are configured to, with the at least one processor, cause the apparatus at least to
obtain a report indicating that a downlink radio link cannot be reliably received as a radio link failure is approaching and further indicating that a time to trigger is running in an available alternative cell; and
initiate sending a command requiring a user equipment that prepared the report to be handed over to a target base station prior to the radio link failure.

17. The apparatus of claim 16, wherein the at least one memory and the computer program code are also configured to, with the at least one processor, cause the apparatus at least to:
include in the command an identification of the base station obtained from the report.

18. The apparatus of claim 16, wherein the at least one memory and the computer program code are also configured to, with the at least one processor, cause the apparatus at least to:
analyze reference symbol received power for at least two base stations identified in the report.

19. The apparatus of claim 16, wherein the at least one memory and the computer program code are also configured to, with the at least one processor, cause the apparatus at least to:
condition initiation of the sending of the command on a determination of whether a desired target base station identified in the report can accept a handover.

20. The apparatus of claim 16, wherein the at least one memory and the computer program code are also configured to, with the at least one processor, cause the apparatus at least to:
determine from among a plurality of candidate target base stations which base station to which the user equipment is to be handed over based on which time to trigger is closest to expiring.

* * * * *